W. H. NICHOLS.
TRACTOR GANG PLOW.
APPLICATION FILED FEB. 16, 1921.
1,390,578.
Patented Sept. 13, 1921.
3 SHEETS—SHEET 1.
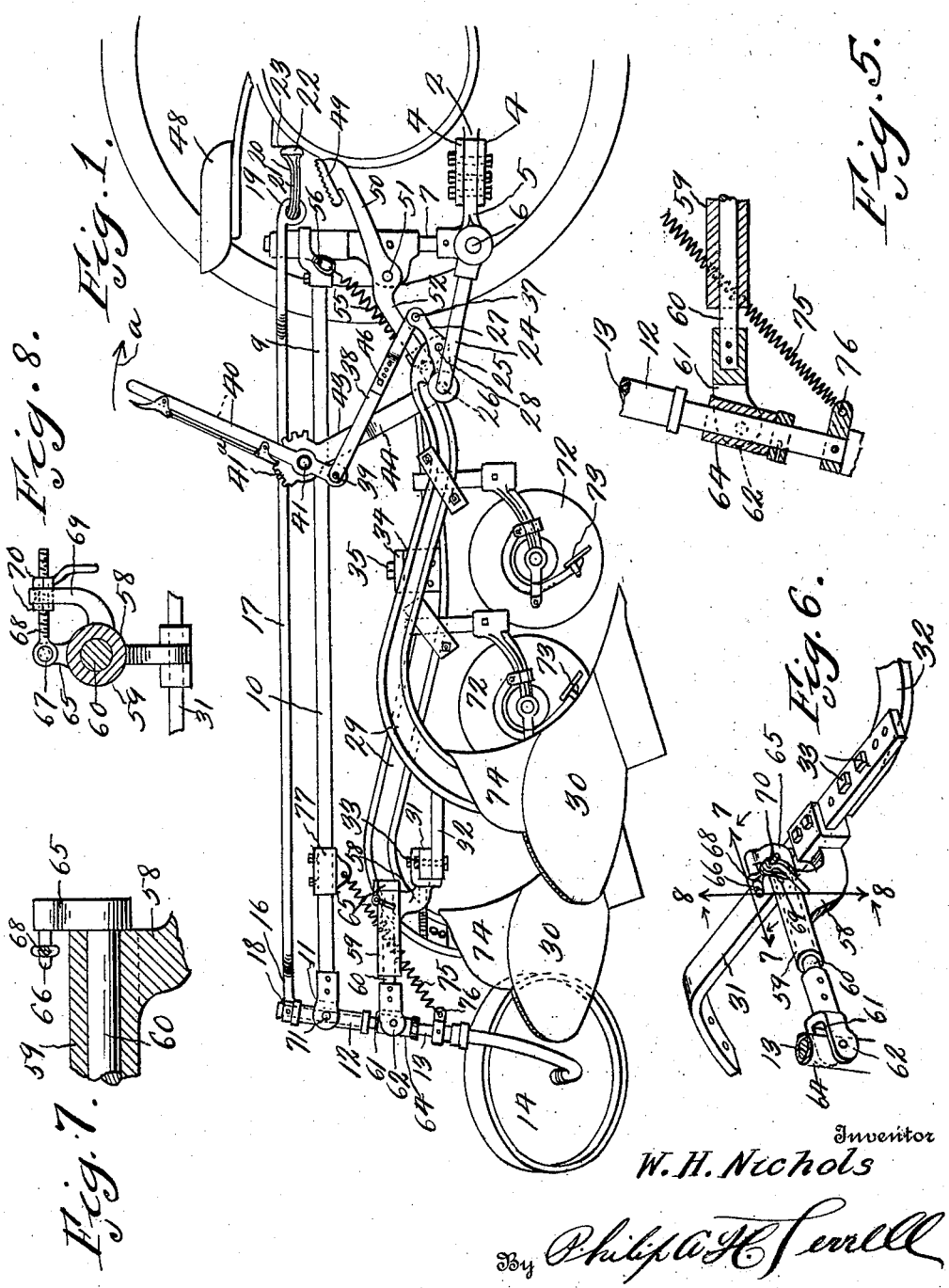
Inventor
W. H. Nichols
By Philip A. H. Terrell
his Attorney

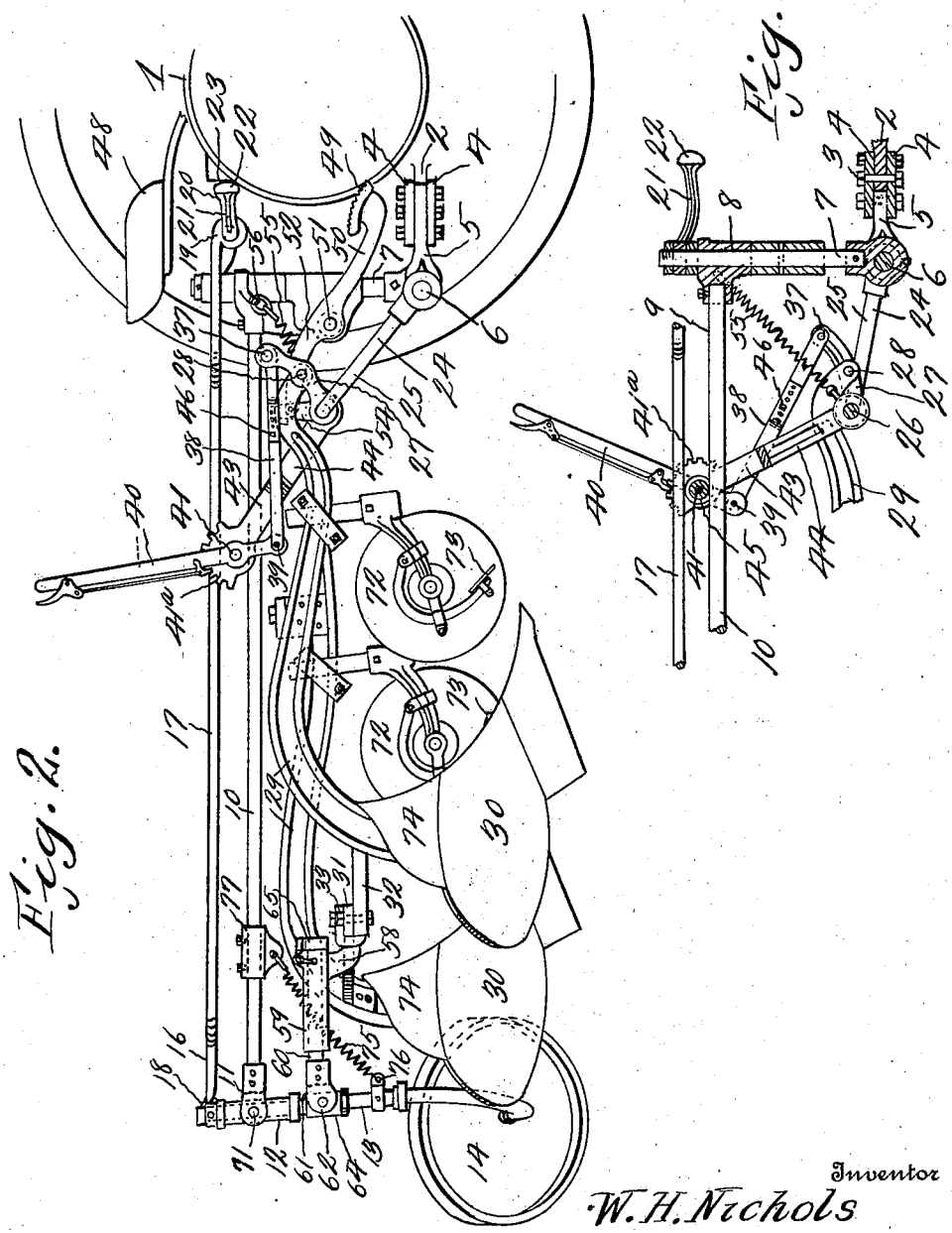

W. H. NICHOLS.
TRACTOR GANG PLOW.
APPLICATION FILED FEB. 16, 1921.

1,390,578.

Patented Sept. 13, 1921.
3 SHEETS—SHEET 3.

Inventor
W. H. Nichols

By Philip H. Ferrell
Attorney

UNITED STATES PATENT OFFICE.

WILLIAM HIRAM NICHOLS, OF LANESVILLE, ILLINOIS.

TRACTOR GANG-PLOW.

1,390,578.  Specification of Letters Patent.  Patented Sept. 13, 1921.

Application filed February 16, 1921. Serial No. 445,486.

*To all whom it may concern:*

Be it known that I, WILLIAM HIRAM NICHOLS, a citizen of the United States, residing at Lanesville, in the county of Sangamon and State of Illinois, have invented certain new and useful Improvements in Tractor Gang-Plows, of which the following is a specification, reference being had therein to the accompanying drawing.

The invention relates to tractor gang plows and has for its object to provide a device of this character wherein a shorter hitch is possible, and wherein the plow can be controlled by the operator from his seat on the tractor, said shorter hitch allowing a shorter turn and more complete finish at the ends of a field. Also to provide a tractor gang plow wherein the parts are reduced to a minimum, thereby reducing the cost of construction and simplifying and making more convenient the manipulation of the plow.

A further object is to provide a gang plow comprising a plurality of plow beams provided with plows, the forward ends of said plow beams being pivotally connected to levers pivotally mounted on a draw-bail, said draw bail being pivotally mounted on a single tree, which single tree is provided with a clevis which may be attached to a tractor. Also to provide an upwardly extending standard carried by the single tree, to which standard is pivoted a guy rod the rear end of which is pivotally connected to a wheel supporting standard for supporting the rear end of the device. The wheel support having pivotally connected thereto a bracket which supports the rear ends of the plurality of plows, and to provide lever means whereby the forward ends of the plows and the draw bail may be raised or lowered as desired.

A further object is to provide means whereby the rear wheel standard may be adjusted transversely.

A further object is to provide means whereby the plow means and their plows may be adjusted transversely in relation to each other for different widths of furrows.

A further object is to provide spring means for assisting the upward movement of the draw bail during a plow raising operation and the forward movement of the wheel standard during said plow raising operation, and also to provide means for limiting the downward movement of the draw bail during a plow lowering operation.

A further object is to provide means operated by coming into engagement with the tractor, when said tractor moves to the right or the left whereby the plow supporting wheel and its standard will be moved in such a manner that the same will properly track behind the tractor thereby allowing short turning of the tractor and gang plow as a whole.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the gang plow showing the same attached to the rear end of a conventional form of tractor and showing the plows in lowered position.

Fig. 2 is a view similar to Fig. 1 but showing the plows in raised position.

Fig. 3 is a top plan view of the plow and rear end of the tractor.

Fig. 4 is a perspective view of a portion of the draw bail and adjacent mechanism.

Fig. 5 is a detail sectional view through the plow supported bracket carried by the wheel standard.

Fig. 6 is a perspective view of the supporting bracket for supporting the rear end of the plow beams, and connecting the same to the wheel standard, and showing the mechanism for transversely adjusting the wheel standard.

Fig. 7 is a detail sectional view taken on line 7—7 of Fig. 6.

Fig. 8 is a detail sectional view taken on line 8—8 of Fig. 6.

Fig. 9 is a detail sectional view vertically through the single tree and bail and the adjacent mechanism.

Fig. 10 is an enlarged detail view of one of the colters showing the shovel arm carried thereby.

Referring to the drawings, the numeral 1 designates a conventional form of tractor and 2 the hitch carried thereby. Pivotally secured to the hitch 2 by means of a king bolt 3 are spaced clevis bars 4, to the ends of which clevis bars are detachably connected rearwardly extending straps 5 in bearings of which a transversely and horizontally disposed single tree 6 is disposed, said single tree being rockably mounted in the bearings of the straps 5 and pivots in a horizontal plan on the king bolt 3 with the clevis bars 4. Pivotally mounted on the single tree 6 and substantially centrally thereof is an upwardly extending post 7, on the upper end of which is pivotally secured as at 8, the forward end 9 of a rearwardly extending guy rod 10, in a bifurcation 11 at the rear end thereof a sleeve 12 is pivoted, said sleeve forming a bearing for a wheel supporting standard 13 on the lower end of which is pivotally secured a supporting wheel. It will be seen that the gang plow as a whole is supported on the single tree 6 and on the supporting wheel 4. Secured to the upper end of the standard 13 is an arm 15 to which arm the offset portion 16 of a guiding rod 17 is pivotally secured by means of a vertically disposed eye 18. The main body of the guide rod 17 is in vertical registration with the guy rod 10 and has its forward end offset to the opposite side to the side on which the offset portion 16 is disposed and is pivotally connected by means of a vertically disposed eye 19 to an outwardly and forward extending arm 20 of a yoke 21, said yoke having its arms disposed on each side of the longitudinal center line and terminating in engaging heads 22, which engaging heads coöperate with the transversely disposed wear plate 23 on the tractor, when said tractor turns to the right or to the left, thereby causing the standard 13 to be pivoted in the sleeve 12 and consequently moving the wheel 14 in such a manner that the gang plow as a whole will track behind the tractor during a turning operation in either direction. It will also be seen that by steering the gang plow that short turns may be made at the ends of rows, thereby allowing the operator to obtain the maximum amount of cultivation in a field.

Secured to the ends of the single tree 6 are the arms 24 of a drawbail 25, said drawbail extending rearwardly and is U-shaped and has its portion 26 transversely disposed. Pivotally mounted on the transverse portion 26 of the drawbail 25 are upwardly and forward extending arms 27 to which arms at points spaced from their ends are pivotally connected as at 28, the forward ends of plow beams 29, said plow beams extending rearwardly and curving downwardly and terminating in plowing elements 30, which may be of any form. The rear ends of the plow beams 29 are secured together by the overlapping arms 31 and 32, which arms are provided with apertures which may be placed in registration and through which apertures bolts 33 may be passed, thereby allowing the plow beam to be adjusted outwardly and inwardly in relation to each other. The plow beams are also braced in relation to each other by overlapping plates 34 through registering apertures of which a bolt 35 passes. During this adjustment of the plow beams in relation to each other the arms 29 are moved inwardly and outwardly on the portion 26 of the drawbail and are held in their adjusted positions by collars 36. Pivotally connected as at 37 to the ends of the arm 27 are connecting rods 38, said connecting rods extending upwardly and rearwardly and are pivotally connected as at 39 to the lower end of operating levers 40, said operating levers being pivotally mounted on the transversely disposed shaft 41, which passes through the toothed segments 41ª carried by the arms 43 of the bar 44 and through a supporting roller 45 disposed on the guy rod 10. The connecting rods 38 are provided with means whereby during an inward and outward adjustment of the plow beams 29 in relation to each other, said rods may be adjusted at their overlapping portions 46. The lower end of the bar 44 is provided with a bearing 47 for the reception of the transverse portion 26 of the drawbail 25. It will be seen that when the operator which occupies the seat 48 on the tractor forces the lever 40 forwardly in the direction of the arrow $a$ that the forward ends of the plow beams 29 will be raised by the rods 38 and arms 27. However, to sufficiently raise the plows so that they will come entirely out of the ground it is necessary to also move the bail 25 upwardly. To accomplish this the operator places his foot on the end 49 of the foot lever 50 and forces the same downwardly on its pivotal point 51. This action causes an upward movement of the arm 52 of the lever 50 and as said arm is pivotally connected as at 53 to an arm 54 which is pivotally mounted on the transverse portion 26 of the bail, said bail will be raised thereby further raising the plows as shown in Fig. 2. To assist in the raising of the bail during the operation of the foot lever 50 springs 55 are provided, the lower ends of which are connected to the bail and the upper ends are connected at 56 adjacent the upper end of the post 7. The downward movement of the bail is controlled by the levers 40 which coöperate with the segmental racks 41 which racks are carried by the bar 44 which is in turn connected to the drawbail. However, the downward movement of the drawbail 25 is also limited by the lug 57 carried by the arm 55, which lug engages the upper edge of the arm 52 of the lever 50. During the movement of the lever 40, it will be seen that said levers will as a whole move longitudinally on the guy rod 10, on which guy rod the levers and the bar 44 are guided by means of the roller 45.

Secured to the overlapping portion 31 of the bar connecting the rear ends of the plow beams 29 and transversely adjustable thereon is a longitudinally disposed bracket 58 in a sleeve 59 of which a rod 60 is mounted, the rear end of said rod being provided with a bifurcation 61 between the arms 62 of which a sleeve 64 is pivoted for vertical movement and through which sleeve the standard 13 passes. Said rod 60 and bracket 58 form means for supporting the rear ends of the plows and at the same time do not interfere with the pivotal action of the standard 13 during a steering operation. The forward end of the rod 60 is provided with an arm 65 having a rearwardly extending lug 66, to which lug is pivotally connected as at 67 an adjusting bolt 68 which passes through an arm 69 carried by the bracket 58 and is provided with nuts 70 located on each side of said arm, by means of which nuts the rod 60 may be adjusted in its bearing for inclining the standard 13 at various angles, thereby allowing adjustment of the supporting wheel 14 inwardly or outwardly in relation to the plow. During a plow raising operation, it will be seen that the plow beams 29 and the plows are moved forwardly, which action will move the standard inwardly at its lower end on the pivotal point 71, thereby additionally raising the rear end of the plow beams, so that they will clear the ground and rise thereover.

Secured to the plow beams are colters 72 which colters are preferably provided with shovel arms 73, which colters and shovel arms prevent choking and perform a harrowing function. They also prevent side movement of the gang plow as a whole. To prevent choking of the plows, said plows are provided with throats 74.

To assist the standard 13 in its forward movement during a plow raising operation a spring 75 is provided, which spring is connected to the standard as at 76 and to an adjusting member 77 carried by the guy rod 10, the tension of said spring being changed by moving the sleeve 77 longitudinally on the guy rod and securing the same in the position to which it is moved.

From the above it will be seen that a gang plow is provided for use in connection with tractors, said gang plow being simple in construction, guidable by the tractor, thereby allowing short turning and the maximum efficiency and so constructed that it may be controlled by the operator located on the tractor.

The invention having been set forth what is claimed as new and useful is:—

1. A tractor drawn gang plow, said gang plow comprising a standard vertically disposed and carried by a horizontally pivoted member of a tractor, a wheel standard vertically disposed and spaced from the first mentioned standard, a horizontally disposed guy rod having its forward end horizontally pivoted on the tractor supported standard and its rear end pivoted to the wheel standard so that said wheel standard may be moved in a longitudinal vertical plane, a bail pivoted adjacent the tractor supported standard and extending rearwardly, lever means for raising said bail, plow beams disposed beneath the guy rod and pivotally connected to the wheel supporting standard at their rear ends, the forward ends of said plow beams being pivotally connected to the bail raising mechanism and spring means for assisting in the raising of the bail and pulling the lower end of the wheel supported standard forwardly during a plow raising operation.

2. A tractor gang plow comprising spaced standards substantially vertically disposed, one of said standards being supported by the tractor, the other standard being supported on a wheel, a guy rod pivoted for horizontal movement at its forward end to the forward standard, the rear standard being pivoted for vertical longitudinal movement in the rear end of the guy rod, a supporting bracket pivoted to the rear standard, plow beams disposed below the guy rod, said supporting bracket supporting the rear ends of said plow beams, a spring connected to the rear standard and to the guy rod and forming means for forcing said rear standard forwardly at its rear end, a bail pivoted adjacent the forward standard, foot and hand operated levers for raising and lowering said bail, the forward ends of the plow beams being pivotally connected to the lever means, and spring means connected to the bail and to the forward standard for assisting in raising the bail during a plow raising operation.

3. The combination with a tractor gang plow comprising a plurality of plow beams disposed beneath a guy rod and between a tractor supported standard and a wheel supported standard and having a bracket connection with the wheel supported standard, of means for raising and lower said plow beams, said means comprising a drawbail pivoted adjacent the tractor supported standard and extending rearwardly, upwardly and forwardly extending arms carried by the transverse portion of said bail, the forward ends of the plow beams being pivoted to said arms at points spaced from their ends, connecting rods pivoted to the ends of said arms and extending rearwardly and having their rear ends pivoted to hand levers supported on the guy rod, a foot lever pivoted to the standard and having a rearwardly extending arm, said rearwardly extending arm having a break joint connection with an arm pivoted on the transverse portion of the bail, spring means connected to the bail and to the tractor supported standard for assisting in raising said bail, an arm pivoted to the bail and extending upwardly and rearwardly, said arm terminating in a bifurcation in which the guy rod is disposed, a roller disposed between the arms of said bifurcations and disposed on the guy rod the arms of the bifurcation being provided with segmental racks with which the hand levers coöperate.

4. The combination with a tractor gang plow comprising a plurality of plow beams disposed between a forward tractor supported standard and a rear wheel supported standard, said standards being connected together and pivoted to the guy rod, a bracket pivoted to the wheel supported standard and secured to the plow beams, of means for raising said plow beams, said means comprising a pivoted bail, lever means connected to said bail for raising the same, spring means for assisting in raising said bail, the forward ends of said plow beams being pivotally connected to the lever means for raising the bail, and means whereby the plow beams may be adjusted laterally in relation to each other.

5. The combination with a tractor gang plow comprising a plurality of plow beams disposed between a forward tractor supported standard and a rear wheel supported standard, said standards being connected together and pivoted to the ends of a guy rod in such a manner that the forward end of the guy rod may swing in a horizontal plane and the wheel supported standard in a vertical longitudinal plane, of means for supporting the plow beams and raising said plow beams, said means comprising a pivoted bail pivoted adjacent the forward standard, arms pivoted to the transverse portion of said bail and having link connections to hand operated levers, said hand operated levers being pivotally connected on arms of a bifurcation of a downwardly extending bar, the lower end of which is pivoted to the bail, the forward ends of the plow beams being pivotally connected to the arms pivoted to the bail, spring means for assisting in the raising of said bail, foot operated means for further assisting in the raising of said bail, and spring means for forcing forwardly the lower end of the wheel supported standard during a plow raising operation.

6. The combination with a gang plow comprising spaced plow beams transversely adjustable in relation to each other and supported at their rear ends by a wheel supported standard, of means for raising said plow beams, said means comprising a pivoted draw bail, pivoted adjacent the forward ends of the plow beams, arms pivoted on the transverse portion of said bail, said arms having pivoted thereto the forward ends of the plow beams and lever means connected to said pivoted arms and to the bail whereby said bail may be raised.

7. The combination with a gang plow comprising spaced plow beams, transversely adjustable in relation to each other and supported at their rear ends by a wheel supported standard, of means for raising said plow beams, said means comprising a pivoted draw bail adapted to spring in a vertical longitudinal plane, arms pivoted to said bail, and extending upwardly and forwardly, the ends of said arms being connected to operating levers for controlling the movement of said arms, the forward ends of the plow beams being pivotally connected to said upwardly extending arms between their pivotal points, a foot operated lever having a break joint connection with an arm carried by the bail and forming means for assisting and raising the bail, spring means for assisting in raising the bail and means whereby the upwardly extending arms carried by the draw bail may be adjusted in relation to each other.

8. The combination with a tractor gang plow comprising a forward standard and a rearward standard having a supporting wheel, said standards being connected together by a guy rod, said guy rod being pivoted to move horizontally to the forward standard, said rear standard being pivoted in substantially vertically disposed bearings, of means for rocking the wheel supported standard when the tractor moves out of a straight course, said means comprising a yoke pivoted on the forward standard and having spaced arms, said yoke having the ends of its arms disposed adjacent an engaging surface of the tractor, an arm transversely disposed and carried by the upper end of the wheel supported standard, and a rod connection between the arm carried by the wheel supported standard and one of the arms of the yoke carried by the forward standard.

In testimony whereof I hereunto affix my signature.

WILLIAM HIRAM NICHOLS.